US 8,473,553 B2

(12) United States Patent
McDevitt et al.

(10) Patent No.: US 8,473,553 B2
(45) Date of Patent: Jun. 25, 2013

(54) MANAGEMENT OF MULTIPLE SYNCHRONOUS RESPONSES TO SINGLE QUESTION IN COMMUNITY-BASED INSTANT MESSAGING

(75) Inventors: Michelle McDevitt, Waltham, MA (US); Josef Scherpa, Fort Collins, CO (US); Andrew L. Schirmer, Andover, MA (US)

(73) Assignee: International Business Machines Corporation, Armonk, NY (US)

(*) Notice: Subject to any disclaimer, the term of this patent is extended or adjusted under 35 U.S.C. 154(b) by 471 days.

(21) Appl. No.: 12/388,997

(22) Filed: Feb. 19, 2009

(65) Prior Publication Data

US 2010/0211646 A1 Aug. 19, 2010

(51) Int. Cl.
*G06F 15/16* (2006.01)

(52) U.S. Cl.
USPC .......................................... 709/206; 709/208

(58) Field of Classification Search
USPC ................................................ 709/206, 208
See application file for complete search history.

(56) References Cited

U.S. PATENT DOCUMENTS

| | | | |
|---|---|---|---|
| 5,828,839 A | 10/1998 | Moncreiff | |
| 6,014,644 A | 1/2000 | Erickson | |
| 6,212,548 B1 | 4/2001 | DeSimone et al. | |
| 6,484,196 B1 * | 11/2002 | Maurille | 709/206 |
| 6,519,629 B2 | 2/2003 | Harvey et al. | |
| 6,993,564 B2 | 1/2006 | Whitten, II | |
| 7,092,821 B2 * | 8/2006 | Mizrahi et al. | 702/1 |
| 7,143,135 B2 * | 11/2006 | Smith et al. | 709/204 |
| 7,246,121 B2 * | 7/2007 | Adar et al. | 1/1 |
| 7,325,034 B2 * | 1/2008 | Douglis et al. | 709/205 |
| 7,328,242 B1 * | 2/2008 | McCarthy et al. | 709/204 |
| 7,475,110 B2 * | 1/2009 | Kirkland et al. | 709/204 |
| 7,668,918 B2 * | 2/2010 | Diddee et al. | 709/206 |
| 7,733,366 B2 * | 6/2010 | Beavers et al. | 348/14.08 |
| 2002/0099777 A1 * | 7/2002 | Gupta et al. | 709/206 |
| 2003/0227479 A1 * | 12/2003 | Mizrahi et al. | 345/753 |
| 2004/0019637 A1 * | 1/2004 | Goodman et al. | 709/204 |
| 2004/0117444 A1 * | 6/2004 | Goodman et al. | 709/204 |
| 2004/0165705 A1 * | 8/2004 | Cragun | 379/88.17 |
| 2005/0065632 A1 * | 3/2005 | Douglis et al. | 700/200 |
| 2006/0026256 A1 | 2/2006 | Diddee et al. | |
| 2006/0059235 A1 * | 3/2006 | Peterson et al. | 709/206 |
| 2006/0090137 A1 | 4/2006 | Cheng et al. | |
| 2006/0174207 A1 | 8/2006 | Deshpande | |
| 2007/0136428 A1 * | 6/2007 | Boutboul et al. | 709/206 |
| 2007/0160970 A1 | 7/2007 | Kaplan | |
| 2007/0219794 A1 * | 9/2007 | Park et al. | 704/246 |
| 2007/0282956 A1 * | 12/2007 | Staats | 709/206 |
| 2008/0028027 A1 * | 1/2008 | Jachner | 709/206 |

(Continued)

*Primary Examiner* — Thomas Dailey
(74) *Attorney, Agent, or Firm* — Cantor Colburn LLP; Jeff Tang (57) ABSTRACT

A computer-implemented method includes sending an instant message communication from a first device of a first person to a plurality of other persons in a topic-based community, and receiving a number of instant message communications at the first device. The method further includes placing each of the response instant message communications in a separate display that is viewable by the first person, and sending a second instant message communication from the first device of the first person to the plurality of other persons after a certain number of response instant message communications have been received by the first device from the plurality of other persons, wherein the second instant message communication is an indication that the first person is satisfied with at least one of the response instant message communications.

12 Claims, 4 Drawing Sheets

U.S. PATENT DOCUMENTS

| | | |
|---|---|---|
| 2008/0126951 A1 | 5/2008 | Sood et al. |
| 2008/0133671 A1* | 6/2008 | Kalaboukis .................. 709/206 |
| 2008/0189378 A1* | 8/2008 | Boutboul et al. ............. 709/206 |
| 2009/0150498 A1* | 6/2009 | Branda et al. ................. 709/206 |
| 2010/0011072 A1* | 1/2010 | Mishchenko ................. 709/206 |
| 2010/0023586 A1* | 1/2010 | Bauchot et al. .............. 709/206 |

* cited by examiner

MANAGEMENT OF MULTIPLE SYNCHRONOUS RESPONSES TO SINGLE QUESTION IN COMMUNITY-BASED INSTANT MESSAGING

BACKGROUND

The present invention relates to electronic or computerized instant messaging, and, more specifically, to management of multiple synchronous responses to a single question in community-based electronic instant messaging.

Electronic or computerized instant messaging tools exist that allow a person (e.g., "User A") to send a question or some other type of communication to some or all members of a particular topic-based community at the same time and in "real time" (i.e., virtually instantaneously). This may be carried out electronically via a desktop or laptop computer and/or hand-held portable or mobile personal communication device (e.g., cell phone, personal digital assistant (PDAs)), or any device capable of sending and receiving an electronic message, most often over some type of wired or wireless communications network(s). Community members may then receive an alert as to the incoming question and the members may then choose to respond in "real time" by either a group response (i.e., a "public" response seen by all other members of the community) or by a private "one-on-one" response only with the sender, User A. This is a type of "synchronous" communication between the initiator or sender of an instant message and one or more recipients of the instant message. However, if the number of members of the community is relatively large, User A may potentially be overwhelmed by the number of responses, particularly those in the private "one-on-one" settings. Also, synthesizing the response information from the responding community members can become difficult if the content of the responses is managed in different windows or views on the visual display device.

BRIEF SUMMARY

According to an embodiment of the invention, a computer-implemented method includes sending an instant message communication from a first device of a first person to a plurality of other persons in a topic-based community, and receiving a number of instant message communications at the first device. The method further includes placing each of the response instant message communications in a separate display that is viewable by the first person, and sending a second instant message communication from the first device of the first person to the plurality of other persons after a certain number of response instant message communications have been received by the first device from the plurality of other persons, wherein the second instant message communication is an indication that the first person is satisfied with at least one of the response instant message communications.

Another embodiment of the invention is a computer program product that includes a computer-readable storage medium having computer program instructions stored thereon that define a method, wherein such instructions, upon execution by a computer cause the computer to implement the method. The method includes sending an instant message communication from a first device of a first person to a plurality of other persons in a topic-based community, and receiving a number instant message communications at the first device. The method further includes placing each of the response instant message communications in a separate display that is viewable by the first person, and sending a second instant message communication from the first device of the first person to the plurality of other persons after a certain number of response instant message communications have been received by the first device from the plurality of other persons, wherein the second instant message communication is an indication that the first person is satisfied with at least one of the response instant message communications.

A further embodiment of the invention is a system that includes a sending module that sends an instant message communication from a first device of a first person to a plurality of other persons in a topic-based community, and a receiving module that receives a number of instant message communications at the first device, each response instant message communication being from one of the plurality of other persons to the first person. The system further includes a display module that displays each of the response instant message communications in a separate display view that is viewable by the first person. The sending module is also operative to send a second instant message communication from the first device of the first person to the plurality of other persons after a certain number of response instant message communications have been received by the first device from the plurality of other persons, wherein the second instant message communication comprises an indication that the first person is satisfied with at least one of the response instant message communications.

According to yet another embodiment of the invention, an electronic instant messaging method includes sending an instant message communication in the form of a question from a first device of a first person to a plurality of other persons, and receiving a number of instant message communications at the first device. Each response instant message communication is in the form of an answer from one of the plurality of other persons to the first person. The method also includes placing each of the response instant message communications in a separate display that viewable by the first person, and sending a second instant message communication from the first device of the first person to the plurality of other persons after a certain number of response instant message communications have been received by the first device from the plurality of other persons, wherein the second instant message communication comprises an indication that the first person is satisfied with at least one of the response instant message communications.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features and advantages of the invention are apparent from the following detailed description in conjunction with the accompanying drawings in which:

FIG. 1, including FIGS. 1A and 1B, is a block diagram of a method for managing instant messaging according to embodiments of the invention;

DETAILED DESCRIPTION

Figures 1, 1A:
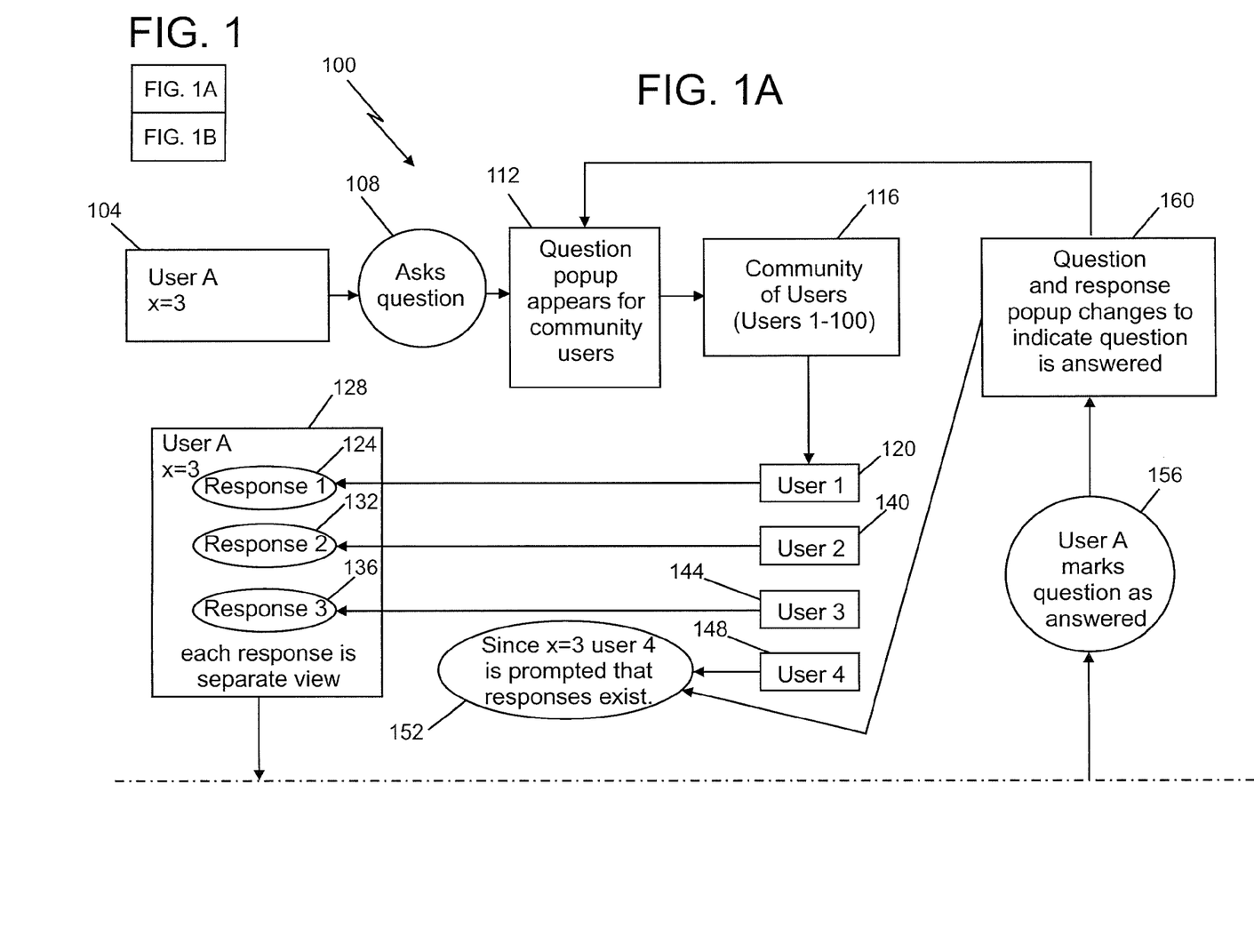
Figure 1B:
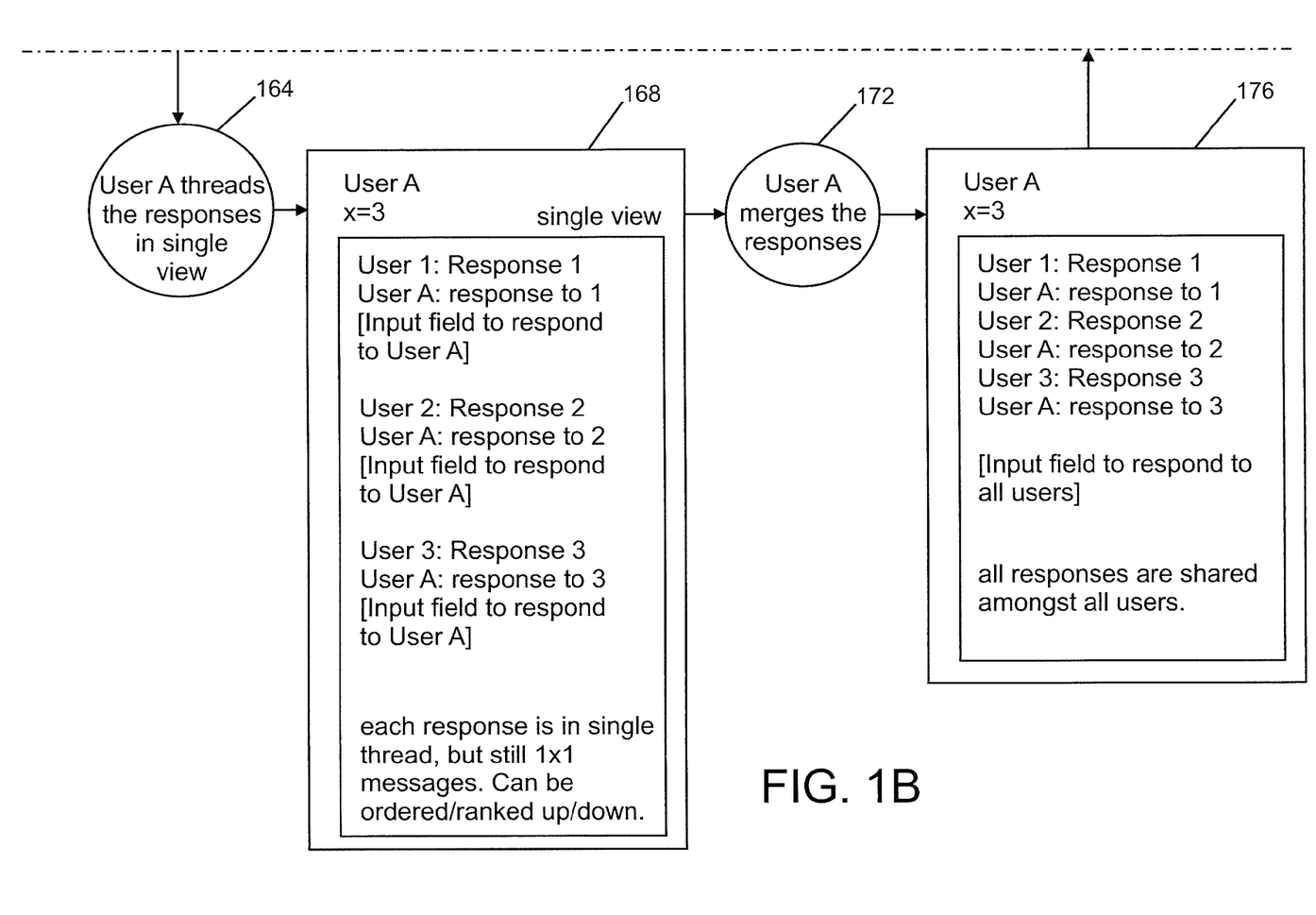

Referring to FIG. 1, including FIGS. 1A and 1B, there illustrated is a block diagram of a method 100 for managing multiple synchronous responses to a single question or other type of real time communication in a community-based instant messaging system according to embodiments of the invention. In a block 104, a person in the form of a sender or initiator of an instant message ("User A"), prepares a question to ask in electronic instant messaging form for a certain number of instant messaging recipients or users. User A and the other persons or users receiving the electronic instant message from User A may utilize electronic devices such as the computer system 300 illustrated in FIG. 3 and described in more detail hereinafter. As previously mentioned, such a computer system may comprise a desktop or laptop computer and/or hand-held portable or mobile personal communication device (e.g., cell phone, personal digital assistant (PDAs)), or any device capable of sending and receiving electronic instant messages, most often over some type of wired or wireless communications network(s). In the alternative, User A may utilize a device in the form of the system illustrated in FIG. 2, as described in detail hereinafter.

The recipients of the instant message sent from User A may be part of a specific topic-based community of people. The sender, User A, may also limit the number of recipients that answer the question by return instant message communication that User A receives before User A stops accepting answers or takes some other action. In an exemplary embodiment, this "maximum" number of answering recipients may equal 3 (i.e., "x"=3), but can be any arbitrary number set by User A. Next, in a step 108, User A sends the question via instant message, and the question then appears virtually simultaneously in real time in a step 112 for all of the members of the selected topic-based community, for example, on the visual display device of the computer for each recipient. In an exemplary embodiment, the number of users in the selected topic-based community is one hundred, as illustrated in a block 116. However, this is purely exemplary; the number of users that a question or other communication from a sender gets sent to may comprise any number of users.

The members of the community then begin to respond via instant messaging to the question sent by User A. The response may be generated by each recipient that chooses to respond by typing in the response message or through some other means on that user's particular computer system. For example, as shown in FIG. 1, a first responder, "User 1" 120, sends his/her response instant messaging communication to User A's question to User A and the response 124 from User 1 is received by User A and shows up on the visual display unit 128 of User A's computer or other device and may also be stored in the computer's memory. In a similar manner, responses 132, 136 from the next two community members to respond, "User 2" 140 and "User 3" 144, are sent to User A and received thereby and show up on the visual display unit 128 of User A's computer. All three responses 124, 132, 136 may each be displayed to User A in a separate view which User A may leave "as is" or User A may optionally reorder, categorize and/or rank the responses according to one or more criteria.

As the responses 124, 132, 136 to User A's question are received by User A via instant messaging communication, User A may choose to respond back to that particular user via instant messaging using User A's device, thereby essentially creating a discussion thread that may be seen only by User A and the other community member that previously responded (e.g., User 2 140); e.g., a private one-on-one discussion. Numerous instant messages may be exchanged between User A and other, single community members in separate private discussion threads, where the incoming and outgoing responses (with respect to User A and each of the other users participating in private discussions with User A) may be displayed and stored similarly to the responses 124, 132, 136 in step 128.

Next, since User A originally set the maximum number of responses that User A would consider to User A's question to three ("x"=3) in the block 104, the next recipient ("User 4" 148) that attempts to send will be prompted in a step 152 by an instant message from user A that a satisfactory number of responses from the community members have already been received. Optionally, User A may, after receiving the maximum number of responses from the community members, may mark the question as being answered in the step 156. User A may then send an instant message in a step 160 to all of the community members that previously received the question from User A to indicate to them that the question has been answered. As such, User A may indicate in the instant message to the community members that User A does not want any more responses to the question.

In this step 160, User A may optionally indicate via the instant message to the community members that the question has been answered but that any recipient that has not responded to the question may still do so. Thus, User A may still consider additional responses for whatever reason, for example, if User A is not satisfied with the responses received so far. If additional responses do get sent from these additional community members via instant messaging, then the added responses may get treated similarly to the already received responses 124, 132, 136. Other options in this step 160 may be that when User A indicates that the question has been answered, User A can also include the one or more answers already received, or can include what User A considers to be the "best" answer, in User A's instant message to the community members. As a result, the community members can consider the responses already provided. User A can also invite the community members via the instant message that they are allowed to follow up with additional information via return instant message regarding the already received answers or the "best" answer already received. Further, in this step 160 User A can also choose to reveal the number and/or identity of the community members who have already responded.

Regardless of the various options for the continued multiway collaboration via instant messaging between User A and the other community members described hereinabove, at some point in time User A may desire to thread the messages sent between User A and each of the other community members that User A communicated with via instant messaging in a step 164. In a block 168, User A has threaded each discussion thread between User A and each of the other community members that User A engaged in a private discussion with in a single view on User A's visual display device and in the order of, for example, the responses received to the question sent by User A. That is, the private one-on-one communication between User A and User 1 120 may be listed first in the view in the block 168, followed by the communication between User A and User 2 140, etc. As can be seen from block 168, any additional private communications between User A and any of the other users may be entered in the appropriate area for each of the other users. In this view in the block 168, User A may optionally reorder, categorize or rank the response threads between User A and the other community members according to various one or more criteria. Thus, as evidenced by the view in the block 168, embodiments of the invention facilitate the real time, synchronous instant messaging communication or collaboration between a plurality of users, and focuses on managing multiple responses between User A and other responding community members in a single window or view.

Next, in a step 172 User A may merge all or some of the responses between User A and other responding community members. These previously private one-on-one conversations may be merged into a single thread in a block 176, where the single thread may be a view that is seen by all community members on their individual display units. These users can then optionally read and respond further, essentially creating an n-way "chat" session between User A and the other community members. Optionally, due to privacy concerns, a responder may choose to prevent its private one-on-one conversation thread with User A from being merged by User A with the other previously private threads. Thus, in the view in the block 168, User A's event history view for responses to the original question includes the single threaded transcript regardless of whether or not it was merged in the block 176. Likewise, each of the other community members that chose to respond to User A's question has an event history that shows the private one-on-one transcript of the communication between itself and User A, and also any merged transcript if User A decided to merge all of the respondents transcripts in the step 172 into the view in the block 176.

Next, if User A has not already done so, User A may mark the question as answered in the step 156 and indicate that fact to the community members via an instant message communication. Then the display unit for each community member will indicate in the step 160 that the question has been answered and, if desired, User A can then ask another question in the step 112.

Thus, for the instant messaging recipient, when a community member attempts to respond to a question, an alert may be provided to the recipient when a certain number of users have already responded. Also, an indication may be provided as to when the question has been answered or not answered as indicated by User A (i.e., the sender or initiator of the question). Further, the answer may be provided to the recipient along with a corresponding opportunity to respond to the question.

Also, for the instant messaging sender or initiator, a single response window for the sender may be provided that shows all incoming responses arranged by the recipient responders. The sender may then respond to individual users within individual discussion threads. Other users may not see the threads from anyone else besides the sender. The sender can indicate when the question has been answered or if more responses are needed.

Figure 2:
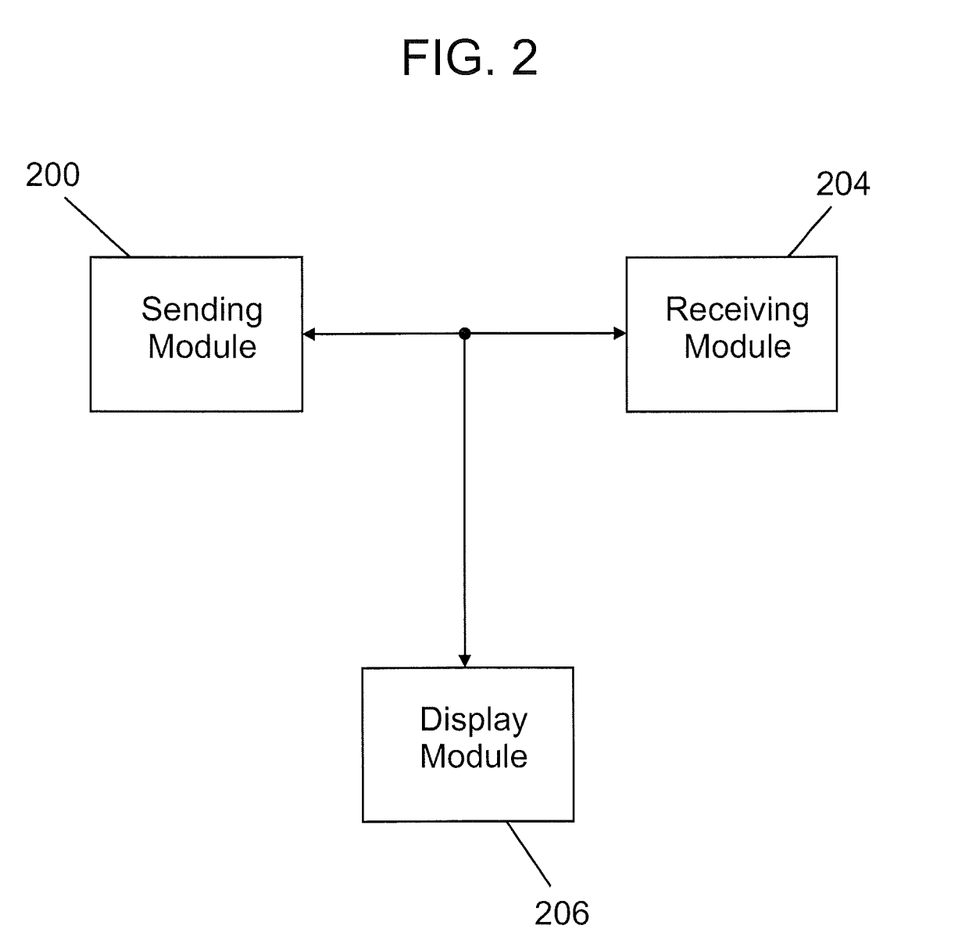
FIG. 2 is a schematic block diagram of a system of an embodiment of the invention.

Referring to FIG. 2, in an embodiment of the invention, a system may include a sending module 200 that sends an instant message communication from a first person (User A) to a plurality of other persons in a topic-based community, and a receiving module 204 that receives a number of instant message communications at the first person, each response instant message communication being from one of the plurality of other persons to the first person. The system utilized by User A may be embodied in a single device, such as a PDA, and the functions as described herein performed by the functional modules of the system may be performed by hardware (e.g., a processor and associated devices such as memory) or software or a combination of both. That is, the sending and receiving modules 200, 204 may be embodied by a processor. Each of the other users besides User A may utilize a system that is somewhat similar to that of FIG. 2.

A display module 206 is operative to display each of the response instant message communications in a separate display view that is viewable by the first person. The sending module 200 is operative to send a second instant message communication from the first person to the plurality of other persons after a certain number of response instant message communications have been received by the receiving module 204 by the first person from the plurality of other persons. The second instant message communication may comprise an indication that the first person is satisfied with at least one of the response instant message communications. The instant message communication sent by the sending module 200 from the first person may be in the form of a question, and wherein the instant message communication received by the receiving module 204 by the first person from one of the plurality of other persons may be in the form of an answer to the question. Also, the sending module 204 sends further instant message communications from the first person to at least one of the plurality of other persons, and the receiving module 204 receives further instant message communications from the at least one of the plurality of other persons, wherein each of the further instant message communications is placed in the display module 206 in the separate display view that is viewable by the first person and by the at least one of the plurality of other persons.

Also, after the sending module 200 sends the second instant message communication indicating that the first person is satisfied with at least one of the response instant message communications, the sending module 200 is operative to send an additional instant message communication from the first person to the plurality of other persons in the topic-based community asking for additional response instant message communications from the plurality of other persons in the topic-based community. In addition, the display module 206 places every instant message communication sent by the sending module 200 and received by the receiving module 204 in a separate threaded view that is viewable by the first person. Each thread in the threaded view may list every instant message communication sent by the sending module 200 from the first person and received by the receiving module 204 from the one of the plurality of other persons. The first person can reorder, rank and/or categorize each thread in the threaded view. The sending module 200 is operative to send an instant message communication with an identification of how many of the plurality of other persons have sent a response instant message communication as received by the receiving module 204 and/or the identity of each of the plurality of other persons that have sent a response instant message communication as received by the receiving module 204.

Further, the display module 206 is operative to merge every instant message communication send by the sending module 200 from the first person and received by the receiving module 204 from each one of the plurality of other persons in a merged threaded view that is viewable by the first person and each of the plurality of other persons. Also, the display module 206 is operative to allow any one of the plurality of other persons to prevent every instant message communication sent by the sending module 200 to the any one of the plurality of other persons and received by the receiving module 204 from the any one of the plurality of other persons from being merged into the merged threaded view.

Embodiments of the invention allow the sender or initiator of a question to review at a later time the history of all of the responses to the original question. Also, embodiments of the invention allow the reduction in the overlap of work performed in managing answers to a question in an instant messaging environment. Embodiments of the invention essentially aggregate the incoming instant messaging transcript content from multiple incoming response partners and presents the content as a single transcript, as all the instant message presumably pertain to an initial topical question sent by one member of a community to other members of that community for response thereto.

Embodiments of the invention enable the user sending the question to view responses from the responders in a single window and to reorder, categorize, rank, merge and publish the answers or comments to the responders while providing necessary privacy controls and proactive alerts to the responders to allow relatively better time and activity management.

Figure 3:
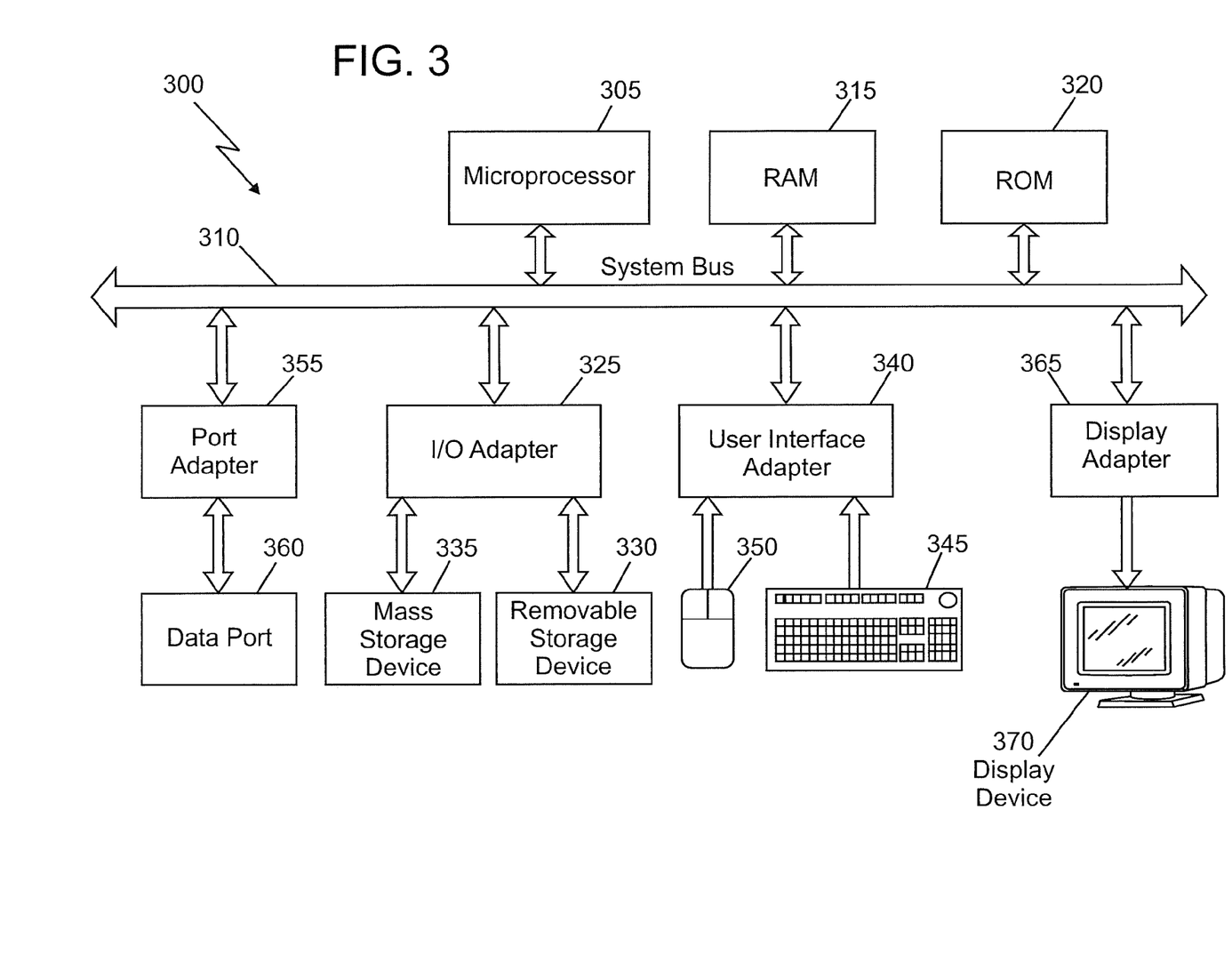
FIG. 3 is a schematic block diagram of a general-purpose computer suitable for practicing embodiments of the present invention.

Generally, method embodiments of the invention may be practiced with a number of computerized devices, for example, a general-purpose computer or hand-held device, and the methods may be coded as sets of instructions on removable or hard media for use by the computer. FIG. 3 is a schematic block diagram of a computer suitable for practicing embodiments of the present invention. In FIG. 3, computer system 300 has at least one microprocessor or central processing unit (CPU) 305. CPU 305 is interconnected via a system bus 310 to a random access memory (RAM) 315, a read-only memory (ROM) 320, an input/output (I/O) adapter 325 for a connecting a removable data and/or program storage device 330 and a mass data and/or program storage device 335, a user interface adapter 340 for connecting a keyboard 345 and a mouse 350, a port adapter 355 for connecting a data port 360 and a display adapter 365 for connecting a display device 370.

ROM 320 contains the basic operating system for computer system 300. The operating system may alternatively reside in RAM 315 or elsewhere as is known in the art. Examples of removable data and/or program storage device 330 include magnetic media such as floppy drives and tape drives and optical media such as CD ROM drives. Examples of mass data and/or program storage device 335 include hard disk drives and non-volatile memory such as flash memory. In addition to keyboard 345 and mouse 350, other user input devices such as trackballs, writing tablets, pressure pads, microphones, light pens and position-sensing screen displays may be connected to user interface 340. Examples of display devices include cathode-ray tubes (CRT) and liquid crystal displays (LCD).

A computer program with an appropriate application interface may be created by one of skill in the art and stored on the system or a data and/or program storage device to simplify the practicing of embodiments of the invention. In operation, information for, or the computer program created to run, embodiments of the present invention is loaded on the appropriate removable data and/or program storage device 330, fed through data port 360 or typed in using keyboard 345.

In view of the above, the method embodiments may therefore take the form of computer or controller implemented processes and apparatus for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing embodiments of the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing embodiments of the invention. When implemented on a general-purpose microprocessor, the computer program code segments configure the microprocessor to create specific logic circuits. A technical effect of the executable instructions is to implement the method embodiments described above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method, comprising:
   sending an instant message communication from a first device of a first person to a plurality of other persons in a topic-based community;
   receiving at the first device a number of response instant message communications as responses from the plurality of other persons in which the responses respectively form private instant message communication threads between the plurality of other persons and the first person;
   responsive to the private instant message communication threads initially being viewable by the first person, merging the private instant message communication threads received at the first device of the first person into a merged threaded view that is viewable by the first person and each of the plurality of other persons; and preventing an identified private instant message communication thread of the private instant message communication threads from being merged into the merged threaded view that is viewable by each of the plurality of other persons, responsive to a particular one of the plurality of other persons selecting to prevent the identified private instant message communication thread from being merged into the merged threaded view, both the private instant message communication threads and the identified private instant message communication thread being immediately and automatically available to the first person on the first device without requiring permission to view and access the private instant message communication threads and the identified private instant message communication thread;

wherein the identified private instant message communication thread corresponds to the particular one of the plurality of other persons.

2. The method of claim 1, wherein the instant message communication sent from the first device of the first person is in the form of a question, and wherein the response instant message communications received at the first device from each of the plurality of other persons are in the form of an answer to the question;

initially placing each of the response instant message communications in a separate display that is viewable by the first person;

wherein the first person of the first device sets a maximum number of the response instant message communications to be received from the plurality of other persons; and sending a second instant message communication from the first device of the first person to the plurality of other persons after the maximum number of the response instant message communications has been received by the first device from the plurality of other persons, wherein the second instant message communication comprises an indication that the first person is satisfied with at least one of the response instant message communications.

3. The method of claim 1, wherein after receiving the number of response instant message communications at the first device, the first device of the first person sending further instant message communications to at least one of the plurality of other persons and the first device receiving further response instant message communications from the at least one of the plurality of other persons, and wherein each of the further response instant message communications is placed in a separate display that is viewable by the first person and by the at least one of the plurality of other persons.

4. The method of claim 1, wherein the identified private instant message communication thread is viewable by the first person of the first device and the particular one of the plurality of other persons, while the merged threaded view is viewable by each of the plurality of other persons and the first person.

5. A computer program product, comprising:

a non-transitory computer-readable storage medium having computer program instructions stored thereon that define a method, wherein such instructions, upon execution by a first device cause the first device to implement the method, the method including sending an instant message communication from the first device of a first person to a plurality of other persons in a topic-based community;

receiving at the first device a number of response instant message communications as responses from the plurality of other persons in which the responses respectively form private instant message communication threads between the plurality of other persons and the first person;

responsive to the private instant message communication threads initially being viewable by the first person, merging the private instant message communication threads received at the first device of the first person into a merged threaded view that is viewable by the first person and each of the plurality of other persons; and preventing an identified private instant message communication thread of the private instant message communication threads from being merged into the merged threaded view that is viewable by each of the plurality of other persons, responsive to a particular one of the plurality of other persons selecting to prevent the identified private instant message communication thread from being merged into the merged threaded view, both the private instant message communication threads and the identified private instant message communication thread being immediately and automatically available to the first person on the first device without requiring permission to view and access the private instant message communication threads and the identified private instant message communication thread;

wherein the identified private instant message communication thread corresponds to the particular one of the plurality of other persons.

6. The computer program product of claim 5, wherein the instant message communication sent from the first device of the first person is in the form of a question, and wherein the response instant message communications received at the first device from each of the plurality of other persons are in the form of an answer to the question.

7. The computer program product of claim 5, wherein after receiving the number of response instant message communications at the first device, the first device of the first person sending further instant message communications to at least one of the plurality of other persons and the first device receiving further response instant message communications from the at least one of the plurality of other persons, and wherein each of the further response instant message communications is placed in a separate display that is viewable by the first person and by at least one of the plurality of other persons.

8. A computer system, comprising:

a central processing unit for executing a computer program, the central processing unit is configured for:

sending an instant message communication from a first person to a plurality of other persons in a topic-based community;

receiving a number of response instant message communications as responses from the plurality of other persons in which the responses respectively form private instant message communication threads between the plurality of other persons and the first person;

responsive to the private instant message communication threads initially being viewable by the first person, merging the private instant message communication threads received at the first person into a merged threaded view that is viewable by the first person and each of the plurality of other persons; and preventing an identified private instant message communication thread of the private instant message communication threads from being merged into the merged threaded view that is viewable by each of the plurality of other persons, responsive to a particular one of the plurality of other persons selecting to prevent the identified private instant message communication thread from being merged into the merged threaded view, both the private instant message communication threads and the identified private instant message communication thread being immediately and automatically available to the first person on the first device without requiring permission to view and access the private instant message communication threads and the identified private instant message communication thread;

wherein the identified private instant message communication thread corresponds to the particular one of the plurality of other persons.

9. The system of claim 8, wherein the instant message communication sent by the first person is in the form of a question, and wherein the response instant message communications received by the first person from one of the plurality of other persons is in the form of an answer to the question.

10. The system of claim 8, wherein the central processing unit is configured to send further instant message communications from the first person to at least one of the plurality of other persons, and the central processing unit is configured to receive further response instant message communications from the at least one of the plurality of other persons, wherein each of the further response instant message communications is placed in a display module in a separate display view that is viewable by the first person and by the at least one of the plurality of other persons.

11. The system of claim 8, wherein the central processing unit is configured to send a second instant message communication indicating that the first person is satisfied with at least one of the response instant message communications.

12. An electronic instant messaging method, comprising:

sending an instant message communication in a form of a question from a first device of a first person to a plurality of other persons;

receiving a number of response instant message communications as responses from the plurality of other persons in which the responses respectively form private instant message communication threads between the plurality of other persons and the first person;

initially placing each of the response instant message communications in a separate display that is viewable by the first person;

responsive to the private instant message communication threads initially being viewable by the first person, merging the private instant message communication threads received at the first device of the first person into a merged threaded view that is viewable by the first person and each of the plurality of other persons; and preventing an identified private instant message communication thread of the private instant message communication threads from being merged into the merged threaded view that is viewable by each of the plurality of other persons, responsive to a particular one of the plurality of other persons selecting to prevent the identified private instant message communication thread from being merged into the merged threaded view, both the private instant message communication threads and the identified private instant message communication thread being immediately and automatically available to the first person on the first device without requiring permission to view and access the private instant message communication threads and the identified private instant message communication thread;

wherein the identified private instant message communication thread corresponds to the particular one of the plurality of other persons.

* * * * *